Patented Feb. 5, 1929.

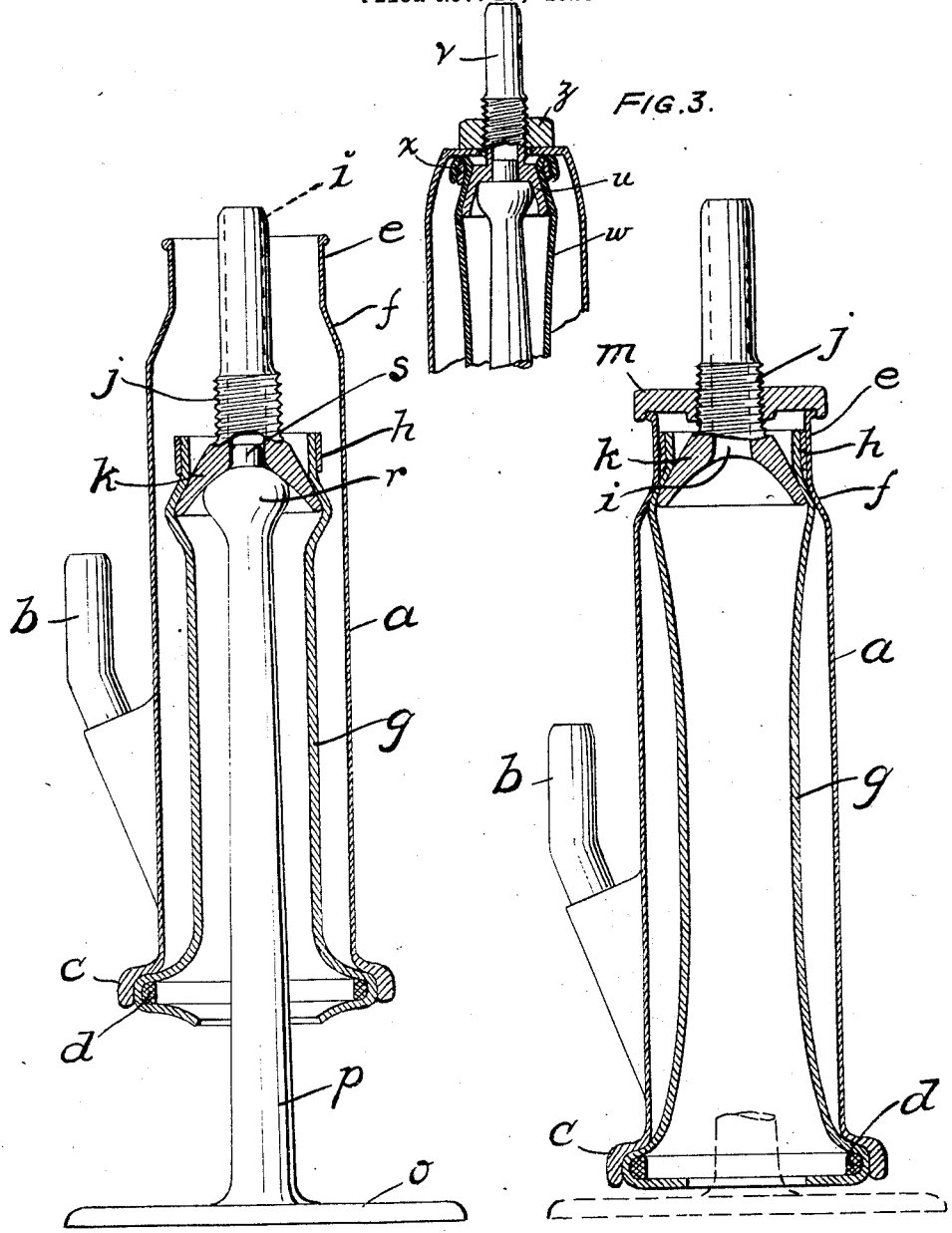

1,701,072

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

TEAT CUP FOR MILKING MACHINES.

Application filed November 17, 1926. Serial No. 148,785.

The object of my invention is to provide a teat cup which is simple and inexpensive in construction, which adapts the rubber liner thereof to be readily stretched, and which insures the holding and retention of the liner in stretched condition.

A preferred embodiment of the invention is shown in the drawings, in which—

Fig. 1 is a longitudinal sectional view of the teat cup before the liner is stretched.

Fig. 2 is a similar view of the teat cup with the liner stretched therein.

Fig. 3 is a similar view of part of a modification.

The shell $a$ is provided with the usual side air tube $b$ and an enlarged mouth $c$ for the reception of a ring $d$ adapted to hold one end of a rubber liner $g$. The construction, as far described, is that of an ordinary type of teat cup, except that the liner may be shorter. The teat cup, as shown, is in a position inverted from that which it occupies in milking; but it will be convenient, in describing the teat cup, to describe it with reference to the position it occupies in the drawing.

The upper end of the shell $a$ has a contracted neck $e$, but instead of the shell neck being connected with the shell body by means of a more or less abrupt shoulder, they are connected by means of a frusto-conical section $f$ of substantial length and area, the angle of the taper to the cylindrical body and neck being, preferably, substantially less than 45°.

Slipped over the end of the liner opposite the end thereof expanded by ring $d$ is a ring or ferrule $h$, which facilitates the insertion of the liner in the shell and cooperates with other elements to stretch the liner as hereinafter described.

A tube, providing a conduit $i$ for outflowing milk and on which the rubber milk tube (not shown) is sleeved, has a somewhat enlarged section threaded at $j$ and an end member or plug $k$ having a frusto-conical or tapered outer face between which and the tapered portion $f$ of the shell $a$ the liner $g$ is adapted to be squeezed. By means of the knurled nut $m$, providing a closure for the end of the shell, the plug is made to squeeze the liner, as above stated, between it and the tapered portion $f$ of the shell.

A teat cup embodying my invention exhibits pronounced advantages, when the parts are assembled, over the ordinary teat cup, and moreover lends itself admirably to the use of a liner stretcher, such as shown in the accompanying drawing, which, while not my invention, has been found to be very effective to stretch liners in known types of teat cups. The stretcher comprises a base $o$, a standard $p$, a head $r$ adapted to the shape of the end concavity of plug $k$, and a boss $s$ adapted to enter the conduit $i$.

To stretch the liner $g$, the ring $d$ is applied to the liner and the ferrule $h$ is slipped over the opposite end. The ferrule facilitates the entrance of the end of the liner into neck $e$ of the shell. The plug $k$ is then placed on the head $r$ of standard $p$ in such position that the boss $s$ on head $r$ enters the conduit $i$ of plug $k$. The liner $g$ is then inserted in the large end of shell $a$. The shell and liner are then slipped over the plug $k$ and standard $p$ and the shell is pushed down until plug $k$ has slipped through the liner to such point that the liner is squeezed between plug $k$ and ferrule $h$. The parts then occupy the position shown in Fig. 1. The operator then pushes shell $a$ down until its further movement is stopped by the plug $k$. The threaded portion $j$ on the plug $k$ will then protrude beyond the end of the contracted end $e$ of the shell. The nut $m$ is then applied to the threaded portion $j$ and turned to firmly secure the liner $g$ between plug $k$ and the edge of shell $a$ formed between $e$ and $f$. Thus, at this point a tight joint is formed between the liner and the plug $k$ and between the liner and shell. The standard $p$ is then withdrawn. The parts then occupy the position shown in Fig. 2.

In the downward movement of the shell while stretching the liner, the liner is prevented from slipping over the plug by ferrule $h$.

The contracted end $e$ of shell $a$ is made sufficiently large to facilitate cleaning.

The shouldered portion $f$ of the shell need not be actually "tapered". A shoulder of any shape will afford a surface between which and the tapered outer face of the plug $h$ the liner may be confined.

The modification of my invention shown in Fig. 3 is permissible, but is deemed to be a less desirable type of construction. In this figure the head $u$ of the milk discharge tube $v$ confines the end of the liner $w$, which is bent over ferrule $x$, against the end of the shell $y$;

the end being closed except for a central orifice for the reception of the tube $v$. The nut $z$ functions only as a nut and not as an end closure.

Having now fully described my invention, what I claim and desire to protect by Letters Patent is:

1. A teat cup comprising a shell, a liner, means to secure one end of the liner to one end of the shell, a member having a milk conduit and enlarged at one end to form a plug extending into the other end of the shell, a nut threaded on said member and adapted to engage the shell, and a ferrule within the shell and surrounding the liner and the plug, said ferrule adapted to facilitate the insertion of the liner into the shell, hold the liner during stretching from slipping off the plug, and adapted, upon the turning of the nut, to be confined between the liner and shell.

2. A teat cup comprising a shell having a tubular body, an end neck and a shouldered portion connecting the body and neck, a liner, means to secure one end of the liner to one end of the shell, a member having a milk conduit and enlarged at one end to form a tapered plug extending into the other end of the shell, a nut threaded on said member, and a ferrule within the shell and surrounding the liner at the end thereof adjacent the plug, said ferrule adapted to facilitate the insertion of the liner into the shell, hold the liner during stretching from slipping off the plug, and adapted, upon the turning of the nut, to be confined between the liner and the neck of the shell.

3. A teat cup comprising a shell having a tubular body, an end neck and a shouldered portion connecting the body and neck, a liner, means to secure one end of the liner to one end of the shell, a member having a milk conduit and enlarged at one end to form a tapered plug extending into the other end of the shell, a ferrule within the shell and surrounding the liner at the end thereof adjacent the plug, and an end closure threaded on said member and adapted, when turned, to draw said plug toward the end closure, confine the liner between the plug and the shell shoulder and ferrule and confine the ferrule between the plug and shell neck.

In testimony of which invention, I have hereunto set my hand, at Philadelphia, Pennsylvania, on this 10th day of November, 1926.

CYRUS HOWARD HAPGOOD.